Nov. 3, 1953    J. T. FAIRHURST ET AL    2,657,436
SLIDING PARTITION
Filed Aug. 14, 1951    6 Sheets-Sheet 1
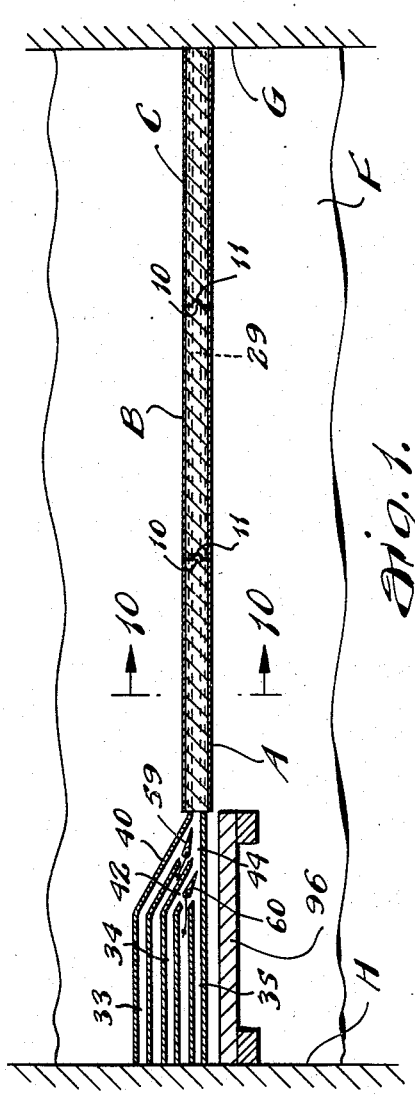
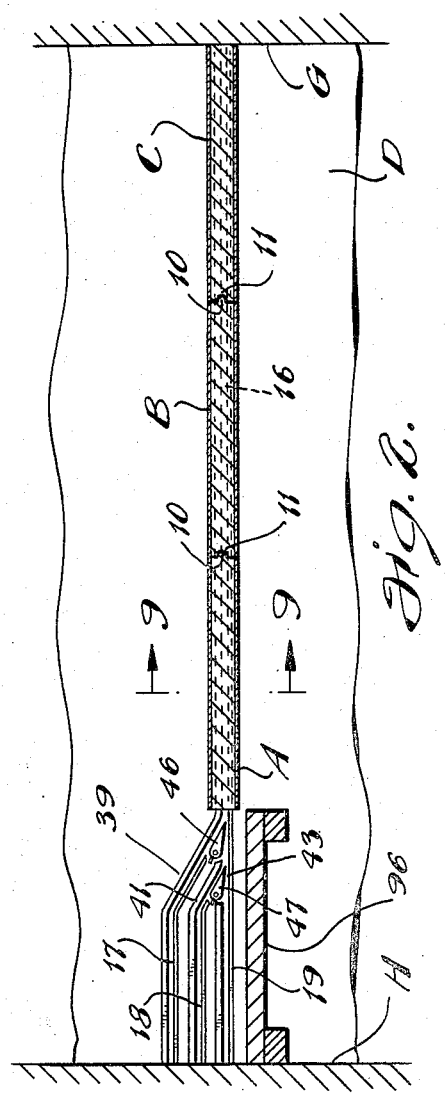
INVENTOR.
JOHN T. FAIRHURST
WALTER FAIRHURST
BY
Clark & Ott
ATTORNEYS

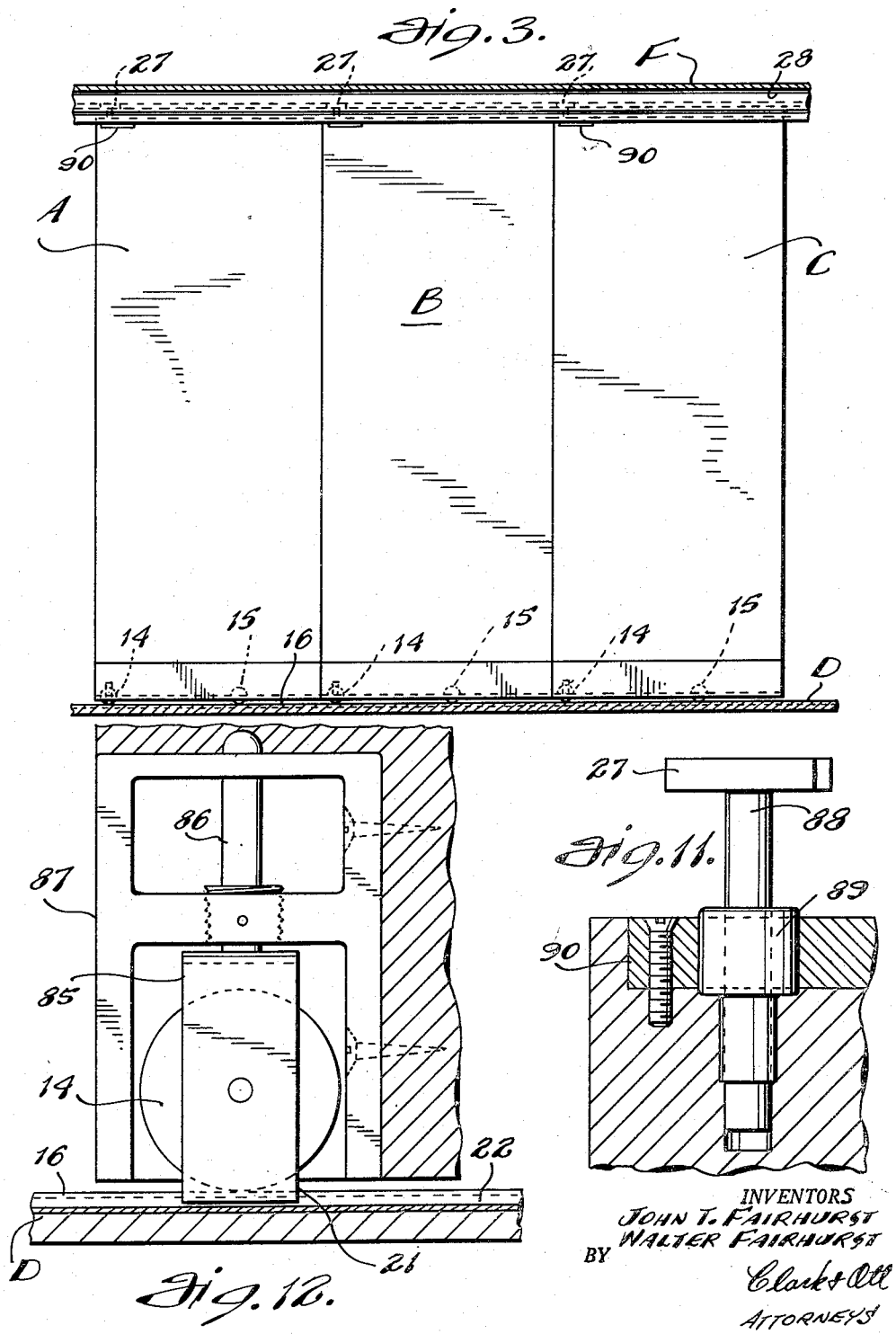

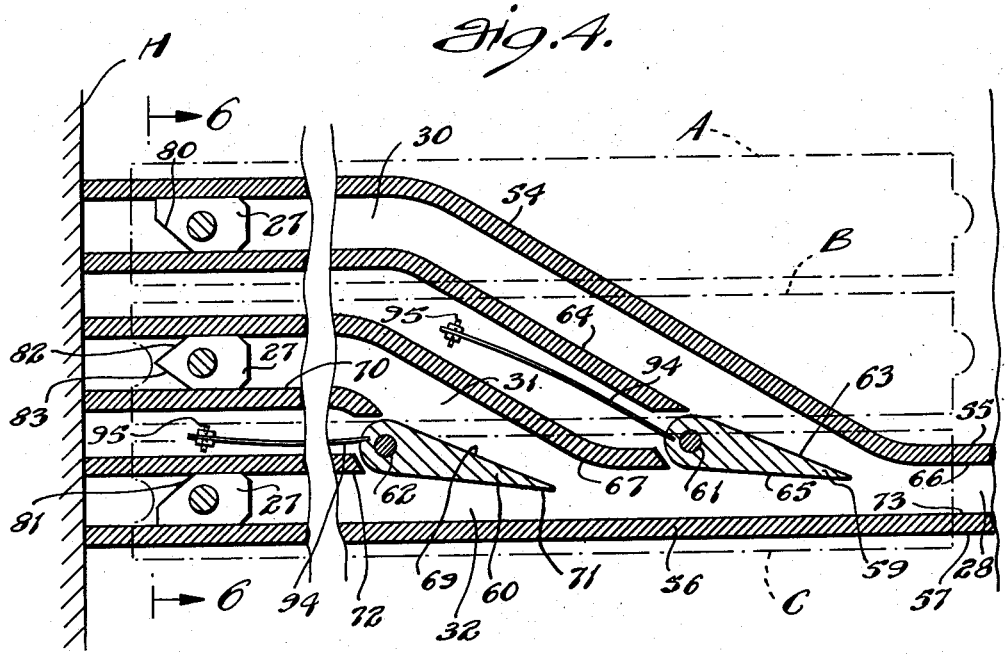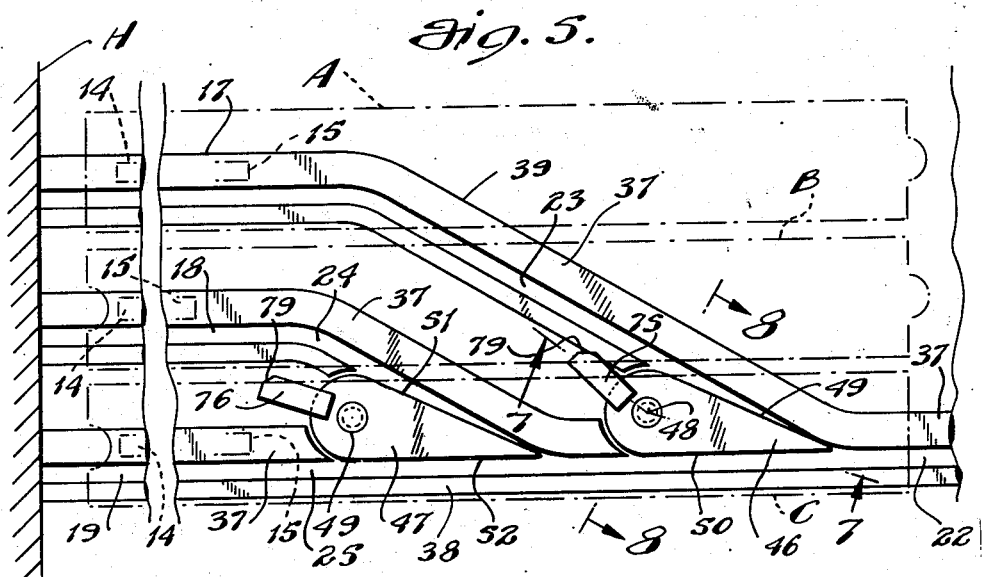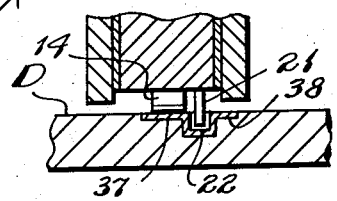

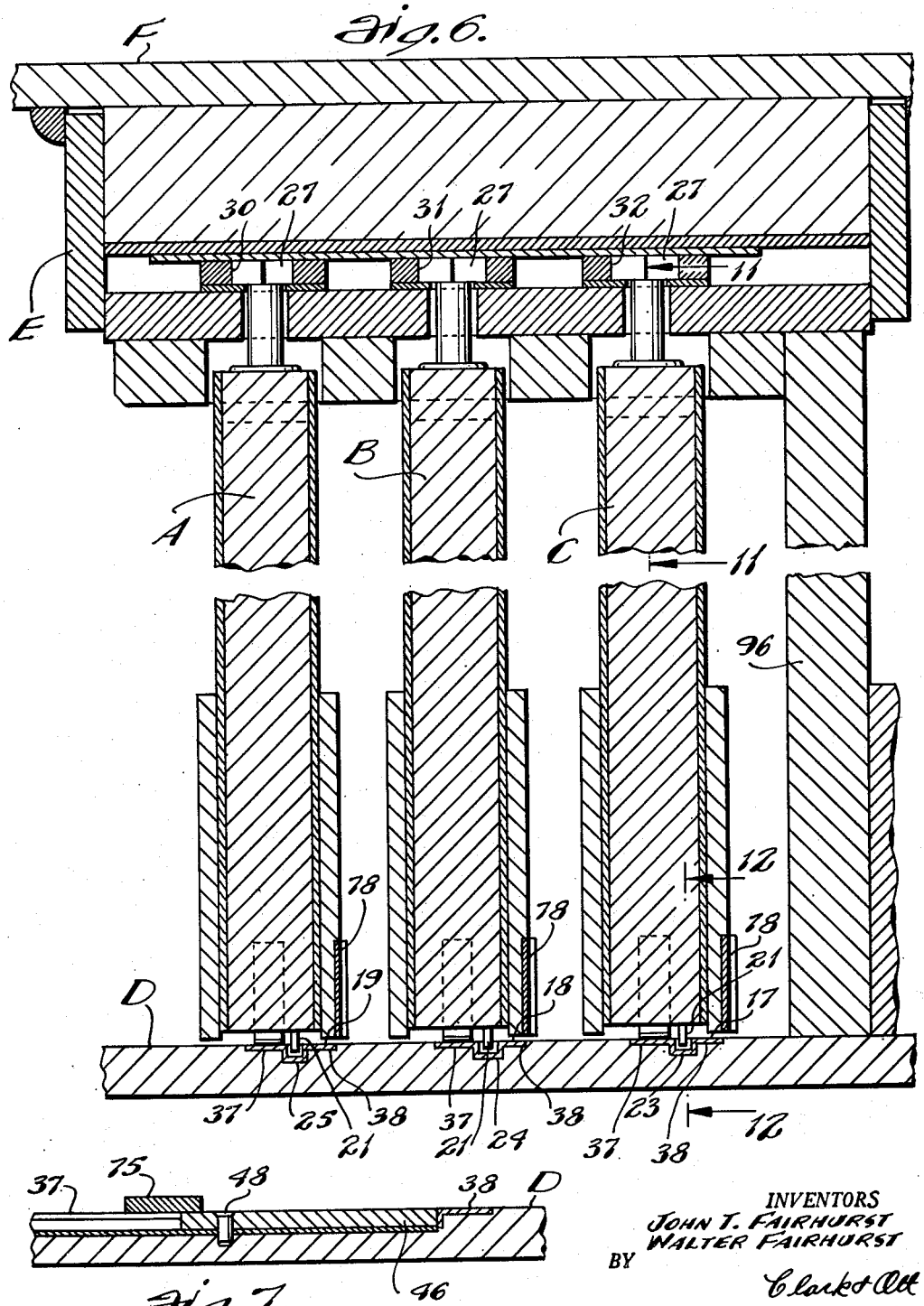

Nov. 3, 1953  J. T. FAIRHURST ET AL  2,657,436
SLIDING PARTITION
Filed Aug. 14, 1951  6 Sheets-Sheet 5

INVENTORS
JOHN T. FAIRHURST
WALTER FAIRHURST
BY
Clark & Ott
ATTORNEYS

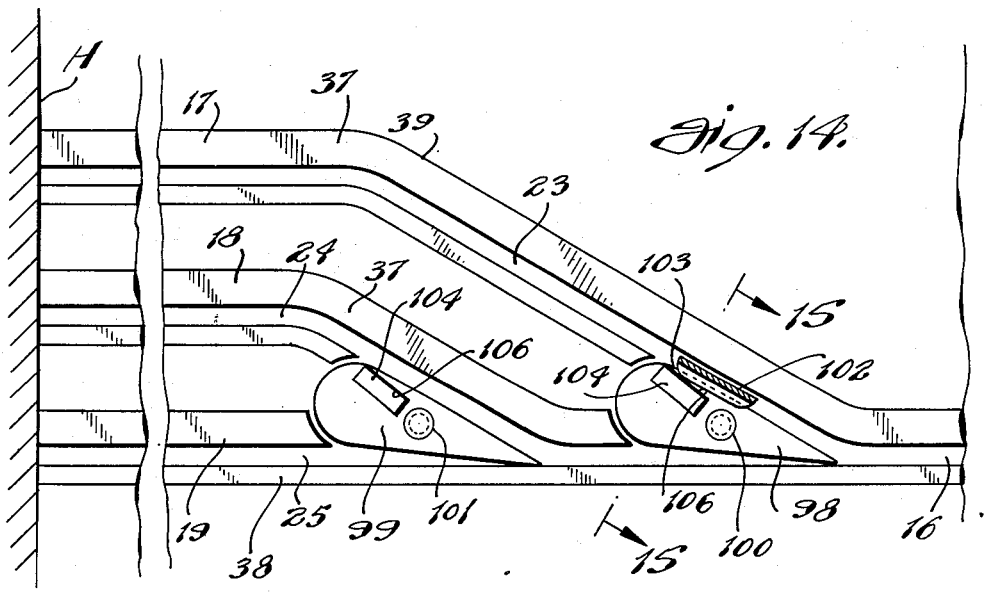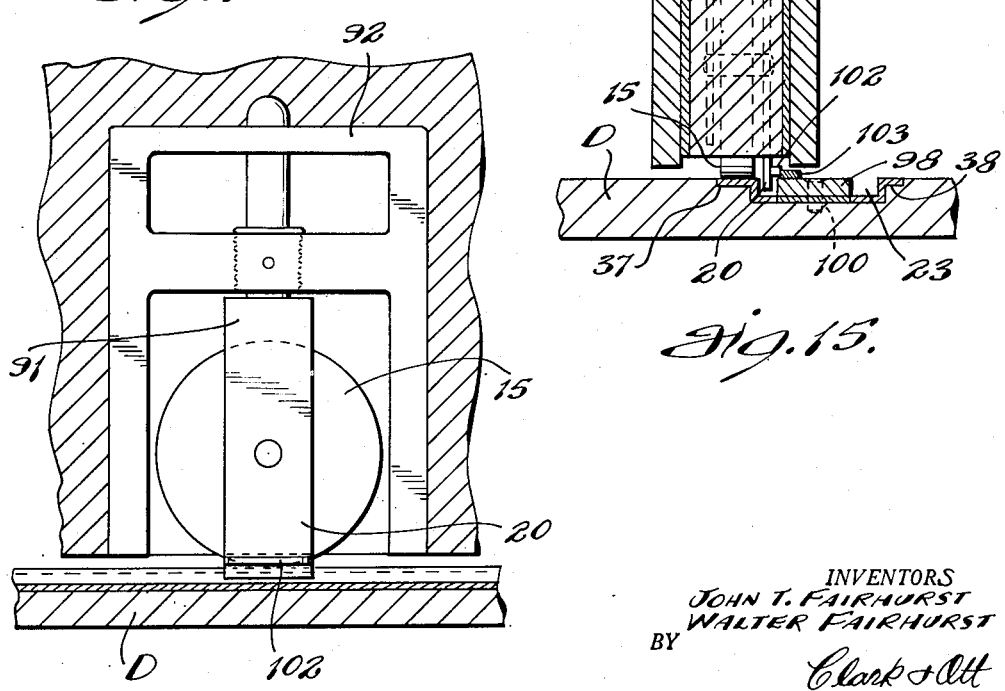

Patented Nov. 3, 1953

2,657,436

UNITED STATES PATENT OFFICE 2,657,436

SLIDING PARTITION

John T. Fairhurst and Walter Fairhurst,
Forest Hills, N. Y.

Application August 14, 1951, Serial No. 241,752

2 Claims. (Cl. 20—19)

1

This invention relates to partitions and has particular reference to a partition composed of independent sections arranged for guided sliding movement from abutting partition-forming relation to an out-of-the-way position in which the sections are disposed in closely spaced parallel relation.

The invention has in view a partition of the character employed in temporarily subdividing rooms and which when in position presents an unbroken wall which may be decorated to harmonize with the decorative effect of the room.

An object of the invention is to provide a partition in which the sections are rollably supported to provide ease of movement thereof and which have guided sliding engagement in floor and overhead tracks for movement of the sections from aligned abutting partition-forming relation to an out-of-the-way position in communicating tracks at one end of the floor and overhead tracks.

Still another object of the invention is to provide partition sections having means for engagement with pivotal switches arranged at the intersection of branch or communicating tracks with the floor and overhead tracks for selectively guiding the sections from the floor and overhead tracks into the branch or communicating tracks for disposing the sections in the out-of-the-way position.

Still another object of the invention is to provide tapered floor and overhead switches disposed in vertical alignment, the floor switches being provided with rearwardly extending tongues and the overhead switches being tensioned to dispose the same intermediate the width of the tracks for engagement by the partition sections so as to swing the floor and overhead switches to thereby permit of the movement of the sections into the branch or communicating tracks respectively.

With the foregoing and other objects in view, reference is now made to the following specification and accompanying drawings in which the preferred embodiment of the invention is illustrated.

In the drawings:

Fig. 1 is a longitudinal horizontal sectional view of the overhead track and branch tracks communicating therewith and showing the partition sections in partition-forming relation.

Fig. 2 is a top plan view of the floor track and branch tracks communicating therewith and showing the partition sections in partition-forming relation.

Fig. 3 is a view in elevation of the partition sections and the floor and overhead tracks and with the floor and ceiling shown in section.

Fig. 4 is an enlarged longitudinal sectional view of the branch overhead tracks as viewed from below, with the partition sections shown in broken lines in the out-of-the-way position.

2

Fig. 5 is an enlarged plan view of the floor branch tracks with the partition sections shown in broken lines in the out-of-the-way position.

Fig. 6 is an enlarged vertical sectional view taken approximately on line 6—6 of Fig. 4.

Fig. 7 is a fragmentary vertical sectional view through one of the floor switches taken approximately on line 7—7 of Fig. 5.

Figure 8:
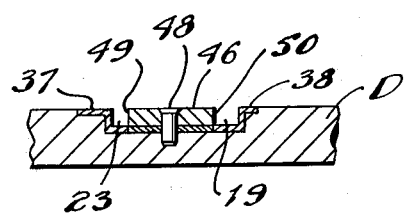

Fig. 8 is a fragmentary cross-sectional view taken approximately on line 8—8 of Fig. 5.

Fig. 9 is a fragmentary vertical sectional view taken approximately on line 9—9 of Fig. 2.

Figure 10:
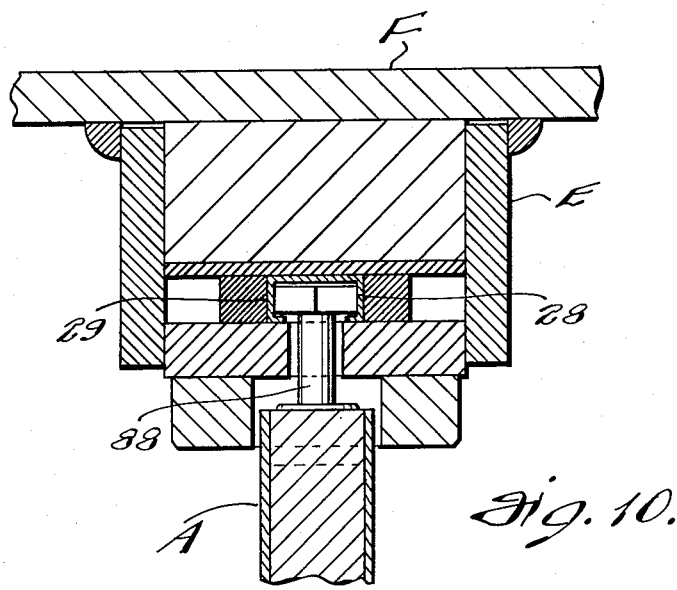

Fig. 10 is a similar view taken approximately on line 10—10 of Fig. 1.

Fig. 11 is a fragmentary vertical sectional view taken approximately on line 11—11 of Fig. 6.

Fig. 12 is a similar view taken on line 12—12 of Fig. 6 showing one of the supporting rollers and mounting therefor in full lines.

Figure 13:
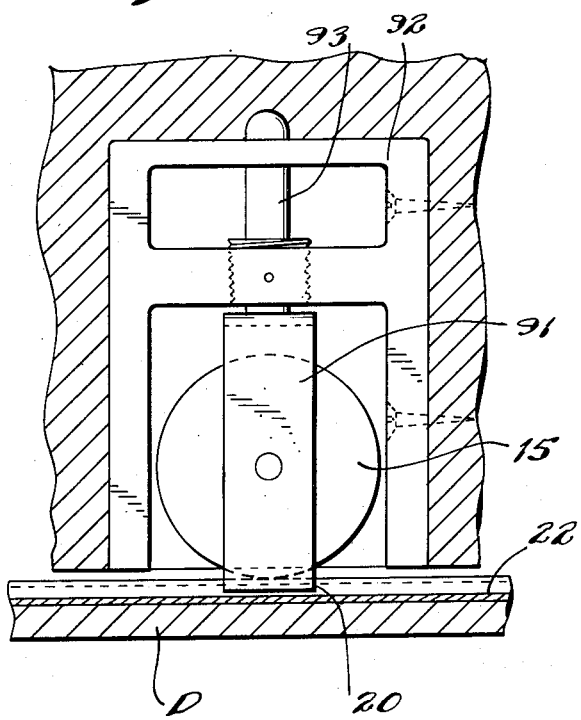

Fig. 13 is a view similar to Fig. 12 showing the other supporting roller and mounting therefor in full lines.

Fig. 14 is an enlarged fragmentary plan view of the floor branch tracks similar to Fig. 5 showing a modified form of floor switches.

Fig. 15 is a fragmentary sectional view taken approximately on line 15—15 of Fig. 14.

Fig. 16 is a view similar to Fig. 12 showing the guide member provided with means for camming the switches shown in Figs. 14 and 15.

Referring to the drawings by characters of reference, the invention is illustrated in its application to a partition composed of three partition sections which are indicated generally by the reference characters A, B and C. The invention is not so limited however, as the size of the room and the portion thereof to be divided determines the number of partition sections. The partition sections A, B and C are of similar construction and are adapted to be disposed in abutting relation to provide an unbroken or continuous wall formation. The confronting vertical edges of the partition sections A and B and the partition sections B and C are formed with interengaging tongue and groove 10 and 11 to provide an interfitted joint when in abutting relation.

The partition sections have supporting rollers 14 and 15 which have rolling engagement with a straight length of floor track 16 and with branch or communicating floor tracks 17, 18 and 19 to dispose the sections in partition-forming position or in an out-of-the-way position. In order to guide the sections to either the partition-forming position or to the out-of-the-way position, the sections are provided with depending guide members 20 and 21 which engage in a guide channel 22 in the floor track 16 and in guide channels 23, 24 and 25 provided in the branch or communicating floor tracks 17, 18 and 19 respectively and which communicate with the channel 22 in the floor track 16. The sections are also provided with upwardly extending guide members 27 which have guided engagement in a channel 26 in a straight overhead track 29 and in guide channels 30, 31 and 32 in branch or communicating overhead tracks 33, 34 and 35, which latter guide channels communicate with the straight channel 28 in the overhead track 29.

The floor track 16 and the branch or communicating tracks 17, 18 and 19 are set in grooves in the floor D and the overhead track 29 and the branch or communicating tracks 33, 34 and 35 are concealed in a drop beam E supported in any desired manner by the ceiling F. The floor track 16 and the overhead track 29 extend from the side wall G of the room to the branch or communicating floor and overhead tracks 17, 18 and 19 and 33, 34 and 35 respectively, which latter tracks terminate at the opposite side wall H.

The floor track 16 as well as the branch or communicating floor tracks 17, 18 and 19 each consist of flat side portions 37 and 38 which extend along opposite sides of the channels 22 and 23, 24 and 25 of said floor tracks respectively and are disposed flush with the upper surface of the floor D as illustrated in Figs. 6 and 7 of the drawings. The floor track 16 and the overhead track 29 are in vertical alignment, while the branch or communicating floor tracks 17, 18 and 19 are in vertical alignment with the branch or communicating overhead tracks 33, 34 and 35. The branch or communicating floor track 17 has a curved portion 39 which is in vertical alignment with a curved portion 40 of the branch or communicating overhead track 33 and which curved portions communicate with the floor track 16 and the overhead track 29 respectively. The branch or communicating floor track 18 is provided with a curved portion 41 which is in vertical alignment with the curved portion 42 of the branch or communicating overhead track 34 and which curved portions communicate with the floor track 16 and the overhead track 29 respectively. Similarly, the branch or communicating floor track 19 has a straight section 43 which is in alignment with the straight section 44 of the branch or communicating overhead track 35 and which straight portions communicate with the floor track 16 and the overhead track 29 respectively.

At the intersection of the curved portion 39 of the branch or communicating floor track 17 with the floor track 16, the side portion 37 of said curved portion aligns with and is formed as a continuation of the side portion 37 of the floor track 16. The channel 23 in said curved portion 39 also aligns with and is formed as a continuation of the channel 22 in the floor track 16. The side portion 38 of the branch or communicating floor track 19 is formed as a continuation of the side portion 38 of the floor track 16, while the side portions 38 of the branch or communicating tracks 17 and 18 and the side portions 37 thereof terminate in spaced relation to the point of intersection of the said branch or communicating floor tracks with the floor track 16 as shown in Fig. 8. The adjacent side walls of the channels 23 and 24 and the adjacent side walls of the channels 24 and 25 are cut away to provide wide channel portions in which are arranged tapered floor switches 46 and 47 which are pivoted for swinging movement on pivot pins 48 and 49 respectively. The floor switch 46 is so arranged that when swung in one direction the side edge 49 thereof aligns with the inner side wall of the channel 23 and when swung in the opposite direction, the opposite side edge 50 thereof aligns with the inner side wall of the channel 25. Similarly, the floor switch 47 is so arranged that when swung in one direction the side edge 51 thereof aligns with the inner side wall of the channel 24 and when swung in the opposite direction the opposite edge 52 thereof aligns with the inner side wall of the channel 25.

At the intersection of the curved portion 40 of the branch or communicating overhead track 33 with the overhead track 29 the side wall 54 of the channel 30 thereof aligns with and is formed as a continuation of the side wall 55 of the channel 28 of the overhead track 29. Similarly, the side wall 56 of the channel 32 of the branch or communicating overhead track 35 aligns with and is formed as a continuation of the side wall 57 of the channel 28 of the overhead track 29. The adjacent side walls of the channels 30 and 31 of the branch or communicating overhead tracks 33 and 34 and the adjacent side walls of the channels 31 and 32 of the branch overhead tracks 34 and 35 are cut away to provide wide channel portions in which are arranged tapered overhead switches 59 and 60 pivoted for swinging movement on pivot pins 61 and 62 respectively. The overhead switch 59 is so arranged that when swung in one direction the side edge 63 thereof aligns with the side wall 64 of the channel 30 of the branch or communicating overhead track 33 and when swung in the opposite direction the side wall 65 thereof aligns with the side wall 66 of the channel 28 of the overhead track 29 and with the side wall 67 of the channel 31 of the branch or communicating overhead track 34. Similarly, the overhead switch 60 is so arranged that when swung in one direction the side edge 69 thereof aligns with the side wall 70 of the channel 31 of the overhead track 34 and when swung in the opposite direction the opposite side edge 71 of said switch aligns with the side edge 72 of the channel 32 of the branch or communicating overhead track 35 and with the side wall 73 of the channel 28 of the overhead track 29.

The floor switch 46 is in vertical alignment with the overhead switch 59 and the floor switch 47 is in vertical alignment with the overhead switch 60. In order to swing said switches to permit the movement of the partition sections from partition-forming position to the out-of-the-way position in the branch or communicating tracks, the floor switches 46 and 47 are provided with tongues 75 and 76 respectively which extend outwardly above the surface of the floor D on a line extending medially through their pivotal connections and the pointed forward ends thereof respectively. The partition sections A, B and C are formed with metallic side plates 78 which engage with the beveled edge 79 of said tongues to swing the floor switches to position the same for guiding the partition sections, as will be more fully set forth in the description of the mode of operation of the partition sections.

The upwardly extending guide members 27 have their forward ends shaped so as to engage with the pointed ends of the overhead switches 59 and 60 to position the same for guiding the partition sections as will be more fully set forth in the description of the mode of operation of the partition sections. For this purpose the guide member 27 of the partition section A is formed with a diagonally extending forward face 80 while the guide member 27 of the partition section C is formed with a similar diagonally extending forward face 81, which latter face is arranged in confronting relation with the face 80. The guide member 27 of the partition section B is formed with diverging forward faces 82 and 83 and which faces engage the pointed ends of the overhead switches 59 and 60 for swinging the same as hereinbefore described.

The supporting rollers 14 are each rotatably mounted between furcations 85 at the lower ends of a vertical stem 86 which is mounted for swivel turning movement in a metal block 87 set in the forward edge of the partition sections. The rollers 14 protrude below the lower edges of the partition sections and rollably engage the side portions 37 of the floor and branch or communicating tracks. One of the furcations 85 is extended to provide the depending guide member 21 which freely engages in the channel 22 of the floor track 16 and in the channels 23, 24 and 25 of the branch or communicating floor tracks 17, 18 and 19. The upwardly projecting guide members 27 are provided on the upper ends of cylindrical shanks 88 which are swivelly mounted in vertical bearings 89 in brackets 90 set in the top of the partition sections to dispose the shanks 88 in axial vertical alignment with the stems 86 supporting the rollers 14. The supporting rollers 15 are located beyond the medial line of the partition sections from the supporting rollers 14 and each of the rollers 15 is mounted for turning movement between furcations 91 at the lower end of a vertical stem 93 which is mounted for swivel turning movement in a metal block 92 set in the bottom edge of the sections respectively to dispose the rollers 15 in protruding relation for rolling engagement with the side portions 37 of the floor and branch or communicating tracks, one of the furcations 91 being extended to provide the depending guide member 20.

The overhead switches 59 and 60 are tensioned by flat leaf springs 94 respectively which are affixed to the rounded inner ends thereof and extend between oppositely disposed set screws 95 adapted to be tightened thereagainst for resiliently retaining the switches with the pointed ends thereof disposed in position for engagement by the forward faces of the guide members 27. For this purpose the overhead switch 59 is located beyond the center of the channel 32 toward the side wall 54 of the branch or communicating overhead track 30, while the overhead switch 60 is disposed beyond the center of the channel 32 toward the side wall 56 of the branch or communicating overhead track 32. When the partition sections are to be moved from the partition-forming position shown in broken lines in Figs. 1 and 2 of the drawings to the out-of-the-way position shown in Figs. 4 and 5 of the drawings, the partition section A is moved on the floor track 16 until the forward face 80 of the guide member 27 thereof engages the pointed end of the overhead switch 59 so as to swing the same against the side wall 56 of the channel 32 whereby the partition section will be directed into the guide channel 30 of the branch or communicating overhead track 33. When the partitions are in partition-forming position, the floor switches 46 and 47 will be adjacent the side portion 38 of the branch or communicating floor track 19 as shown in Fig. 5, whereby the channel 23 of the branch or communicating floor track 17 is in open communication with the channel 22 of the floor track 16. Thus the guide member 21 will engage in the channel 23 with the movement of the guide member 27 of the partition section A in the channel 30 to dispose the said partition section in the out-of-the-way position.

With the movement of the partition section A past the floor switch 46 the side plates 78 of said section engages the tongue 75 to swing the switch adjacent to the side portion 37 whereby the channel 24 of the branch or communicating floor track 18 is in open communication with the channel 22 of the floor track 16. The section B is then moved until the forward face 82 of the guide member 27 thereof engages the pointed end of the overhead switch 59 to swing the same towards the side wall 54 of the channel 30 to thereby permit the said section to continue in the channel 32 until the opposite side face 83 of said guide member engages the pointed end of the overhead switch 60 to swing the same against the side face 56 of the channel 32. The partition section will then be guided into the channel 31 of the branch or communicating overhead track 34, while the channel 25 is opened to permit the guide member 21 thereof to engage the floor switch 47 for guiding the same into the channel 24 of the branch or communicating floor track 18, whereby the said section B will be disposed in the out-of-the-way position adjacent to and parallel with the partition section A.

With the movement of the partition section B past the floor switch 47, the side plate 78 thereof will engage the tongue 76 to swing the same adjacent to the side portion 37 of the branch or communicating floor track 18 so that the channel 23 is open to receive the partition section C. The partition section C is then moved until the forward face 81 of the guide member 27 thereof successively engages the overhead switches 59 and 60 to move the same towards the side portions 54 and 67 of the channels 30 and 31, whereby the channel 32 is opened to receive the said partition section and the channel 25 being open the partition section C is moved in said channels into the out-of-the-way position adjacent to and parallel with the partition section B.

The partition sections are also adapted to be moved in the channels from the out of the way position to partition-forming relation. With the movement thereof, the same engage the tapered side edges of the floor and overhead switches to thereby move the same to clear the channels at the intersections of the branch or communicating tracks with the main tracks for movement of the sections past the switches.

The branch or communicating floor and overhead tracks are disposed adjacent to a permanent wall portion 96 which projects into the room from the side wall H thereof and which forms a partition portion when the partition sections are in partition-forming relation.

The partition is described herein as being formed of partition sections, the same are frequently referred to as partition units and doors.

In place of the floor switches 47 and 48, floor switches 98 and 99 may be utilized as illustrated in the modified form shown in Figs. 14 and 15 of the drawings. The floor switches 98 and 99 are pivoted for swinging movement to one side of the channels 23 and 24 respectively on pivot pins 100 and 101 and which have swinging movement similar to the floor switches 46 and 47 for directing the partition sections from the floor track 16 to the branch or communicating floor tracks 23 and 24.

In order to swing the floor switches on the pivot pins 100 and 101, the guide member 20 of the roller 15 of each of the partition sections is provided with a lateral projection 102 having a beveled or cam face 103 adapted to engage against members 104 and 105 mounted on the top of the switches respectively and which have a side face 106 located at an angle to the medial line extending through the pivot pins and the pointed end thereof for engagement thereagainst by the aforesaid projection 102 to thereby swing the switches with the movement of the roller 15 past the rear portion of the switches.

The floor switches 98 and 99 are moved by the partition sections similar to the movement of the floor switches 47 and 48. When the partition section A is moved from the floor track 16 to the out of the way position in the branch track 17, the guide member 21 engages against the floor switch 98 to direct the partition section into engagement with the channel 23 and when the roller 15 is adjacent the floor switch 98, the projection 102 of the guide member 20 thereof will engage the projection 104 to cam the floor switch 98 on its pivotal connection to open the channel to permit the movement of the partition section B from the channel 22 of the floor track 16 into the channel 24 of the branch track 18. Similarly, the projection 102 of the guide member 20 of the partition section B will cam the floor switch 99 to permit the movement of the partition section C into the channel 25 of the branch track 19.

While the preferred forms of the invention have been illustrated and described herein, it is to be understood that the same is not limited thereto and the invention covers and includes any and all forms falling within the purview thereof.

What is claimed is:

1. In a partition construction of the character described, a plurality of sliding partition sections each having rollable supporting members, vertically aligned main floor and overhead channel tracks and vertically aligned branch floor and overhead channel tracks arranged with the branch floor tracks communicating with the main floor tracks and with the branch overhead tracks communicating with the main overhead tracks, said floor tracks each having a flat portion on which said rollable members are rollably supported, floor switches pivotally arranged in the channels at the intersections respectively of the branch floor tracks with the main floor tracks and having tapered ends disposed toward the main floor tracks, overhead switches pivotally arranged in the channels at the intersections respectively of the branch overhead tracks with the main overhead tracks and having tapered ends disposed toward said main overhead tracks, said overhead switches being tensioned to normally maintain the tapered ends thereof intermediate the width of the channel tracks, said partition sections having upwardly extending projections engaging in said overhead channel tracks and formed with angulated cam faces for engagement with the tapered ends of said overhead switches to thereby swing the same from normal tensioned position to open relation during movement of the partition sections from set-up position in the main track to the out-of-the-way position in the branch tracks, said partition sections having downwardly extending projections engaging in said channel tracks for guiding said partition sections and for engaging said switches to thereby move the same to open relation during movement of the partition sections from the out-of-the-way position in the branch tracks to set-up position in the main tracks, said floor switches having projections extending above the tracks and said partition sections having means adapted to engage said switch projections respectively to thereby swing one of the switches for opening up a branch track for the next succeeding partition section during movement from set-up position in the main track to the out-of-the-way position in the branch tracks respectively.

2. In a partition construction of the character described, a plurality of sliding partition sections each having rollable supporting members, vertically aligned main floor and overhead channel tracks and vertically aligned branch floor and overhead channel tracks arranged with the branch floor tracks communicating with the main floor tracks and with the branch overhead tracks communicating with the main overhead tracks, said floor tracks each having a flat portion on which said rollable members are rollably supported, floor switches pivotally arranged in the channels at the intersections respectively of the branch floor tracks with the main floor tracks and having tapered ends disposed toward the main floor tracks, overhead switches pivotally arranged in the channels at the intersections respectively of the branch overhead tracks with the main overhead tracks and having tapered ends disposed toward said main overhead tracks, said overhead switches being tensioned to normally maintain the tapered ends thereof intermediate the width of the channel tracks, said partition sections having upwardly extending projections engaging in said overhead channel tracks, said projections on the endmost partition sections having angulated cam faces arranged with the cam face on one end section disposed in opposite relation to the cam face on the other and said projection on the intermediate partition section having oppositely disposed angulated cam faces for engagement of the said cam faces of the several projections with the tapered ends of said overhead switches to thereby swing the same from normal tensioned position to open relation during movement of the partition sections from set-up position in the main track to the out-of-the-way position in the branch tracks respectively, said partition sections having downwardly extending projections engaging in said channel tracks for guiding said partition sections and for engaging said switches to thereby move the same to open relation during movement of the partition sections from the out-of-the-way position in the branch tracks to set-up position in the main tracks, said floor switches having projections extending above the tracks and said partition sections having means adapted to engage said switch projections respectively to thereby swing one of the switches for opening up a branch track for the next succeeding partition section during movement from set-up position in the main track to the out-of-the-way position in the branch tracks respectively.

JOHN T. FAIRHURST.
WALTER FAIRHURST.

References Cited in the file of this patent
UNITED STATES PATENTS

| Number | Name | Date |
|---|---|---|
| 1,934,299 | Fairhurst | Nov. 7, 1933 |
| 2,052,089 | Fairhurst | Aug. 25, 1936 |

FOREIGN PATENTS

| Number | Country | Date |
|---|---|---|
| 13,652 | Great Britain | June 3, 1897 |